United States Patent
Lee et al.

(10) Patent No.: US 9,521,696 B2
(45) Date of Patent: Dec. 13, 2016

(54) WIRELESS ACCESS POINT CELL ID INSERTION IN FRAME HEADER

(75) Inventors: Jung Gun Lee, Mountain View, CA (US); Raul Hernan Etkin, Sunnyvale, CA (US); Sung-Ju Lee, Redwood City, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 12 days.

(21) Appl. No.: 14/400,367

(22) PCT Filed: Jul. 31, 2012

(86) PCT No.: PCT/US2012/048949
§ 371 (c)(1),
(2), (4) Date: Nov. 11, 2014

(87) PCT Pub. No.: WO2014/021836
PCT Pub. Date: Feb. 6, 2014

(65) Prior Publication Data
US 2015/0131555 A1    May 14, 2015

(51) Int. Cl.
| H04W 76/02 | (2009.01) |
| H04W 48/20 | (2009.01) |
| H04L 12/741 | (2013.01) |
| H04W 76/06 | (2009.01) |
| H04W 88/08 | (2009.01) |

(52) U.S. Cl.
CPC ............ *H04W 76/021* (2013.01); *H04L 45/74* (2013.01); *H04W 48/20* (2013.01); *H04W 76/06* (2013.01); *H04W 88/08* (2013.01)

(58) Field of Classification Search
CPC ..... H04L 45/74; H04W 48/20; H04W 76/021; H04W 76/06; H04W 88/08
USPC .......................................... 370/329
See application file for complete search history.

(56) References Cited

U.S. PATENT DOCUMENTS

| 6,480,537 | B1 * | 11/2002 | Agrawal | H04N 21/235 375/240 |
| 7,257,095 | B2 * | 8/2007 | Liu | H04W 52/0229 370/311 |
| 2005/0083867 | A1 * | 4/2005 | Dombrowski | H04L 29/12009 370/311 |
| 2005/0239411 | A1 * | 10/2005 | Hazra | H04L 1/0021 455/67.11 |
| 2006/0153122 | A1 | 7/2006 | Hinman et al. | |
| 2012/0063433 | A1 | 3/2012 | Wentink | |
| 2012/0163292 | A1 * | 6/2012 | Kneckt | H04W 52/0229 370/328 |
| 2014/0293868 | A1 * | 10/2014 | Levanen | H04L 1/1607 370/328 |

FOREIGN PATENT DOCUMENTS

WO    WO-2008049220 A1    5/2008

* cited by examiner

*Primary Examiner* — Stephen J Clawson
(74) *Attorney, Agent, or Firm* — Brooks, Cameron & Huebsch, PLLC

(57) ABSTRACT

A wireless access point includes a wireless interface to send or receive frames in a cell in a wireless network. A storage device stores a cell ID that uniquely identifies the wireless access point. Processing circuitry inserts the cell ID in a physical layer header of a frame, and sends the frame to a client device in the cell via the wireless interface.

15 Claims, 4 Drawing Sheets

WIRELESS ACCESS POINT CELL ID INSERTION IN FRAME HEADER

BACKGROUND

A client in a wireless network associates with a wireless access point (WAP) to get connectivity, for example, to and from the Internet, and to further communicate with other clients via the wireless network. A client typically relies on one WAP at any given time for all communications in the wireless network. Commonly, the wireless network includes multiple WAPs, each servicing its own set of clients. In these situations, communications from neighboring WAPs may interfere with communications between a WAP and its client.

BRIEF DESCRIPTION OF DRAWINGS

The embodiments are described in detail with reference to the examples shown in the following figures.

DETAILED DESCRIPTION OF EMBODIMENTS

For simplicity and illustrative purposes, the principles of the embodiments are described by referring mainly to examples thereof. In the following description details are set forth in order to provide a thorough understanding of the embodiments. It is apparent that the embodiments may be practiced without limitation to all the specific details. Also, the embodiments may be used together in various combinations.

According to an embodiment, a cell ID is included in a frame header to determine whether a frame is for a network device in a cell in a wireless network. For example, a client in a cell may communicate with a wireless access point (WAP) in the cell on a channel. Interference may occur from communications in a neighboring cell using the same channel. For example, if a radio of a network device (e.g., WAP or client device) detects a valid frame preamble and decodes its physical layer header, the radio locks on to the frame until the entire frame is received regardless of whether the frame is destined to it or not. The media access control (MAC) destination address is a part of physical layer data payload of the frame. Thus, the MAC destination address cannot be used to decide whether or not to keep receiving the current frame until the payload is received and decoded. Locking on unnecessary frames affects performance because if a desired frame arrives when the receiver has already locked on a previously arrived interfering frame, the receiving device in most cases cannot receive the desired frame. Also, the locking on the interfering frame also causes a physical layer (PHY) carrier sense indicator to be in a BUSY state, thus blocking the radio from transmitting its own frame. Hence, the locking problem hurts transmission and reception throughput performance.

According to an embodiment, a unique cell ID is determined for the cell that is different than a cell ID used by other WAPs in neighboring cells that may be using the same channel. The cell ID is included in a header of the frame, so the entire frame does not need to be received and decoded by the destination device (e.g., client device or WAP) to determine whether the frame is destined for it. The cell ID may be in a physical layer header of the frame. For example, the cell ID may be in a 802.11 PHY level header (e.g., PLCP). Before receiving and decoding the payload and the entire frame, the client device decodes the physical layer header, which comes ahead of the payload, to determine the cell ID in the header, which may then be used to determine whether the frame is for the receiving device. If the frame is not for the receiving device, the destination device is then released to send or receive other frames, thus improving throughput for the destination device.

Figure 1:
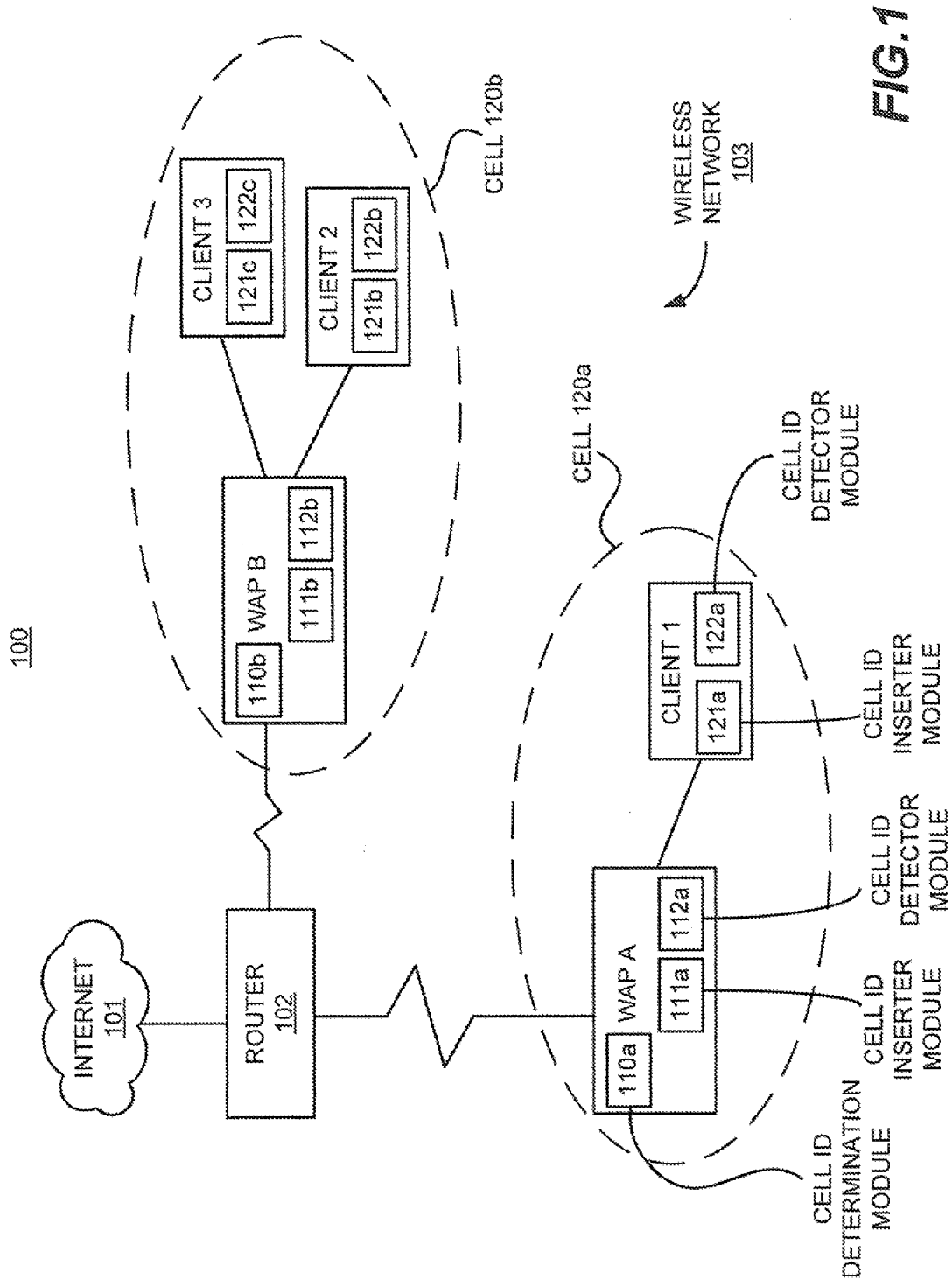
FIG. 1 illustrates wireless access points (WAP and clients in a wireless network.

FIG. 1 illustrates a block diagram of a system 100. The system 100 includes a wireless network 103. The wireless network 103 may be connected to the Internet 101, or an access network or any wide area network (WAN) or other network, and not just the Internet 101.

The wireless network 103 includes a router 102, multiple WAPs, shown as WAPs A-B, and multiple clients 1-3. Cells 120a-b, including a WAP and its associated client(s). More or less than two WAPs and two cells, more routers and more or less clients may exist in each cell in the wireless network 103. The number of network devices shown is for illustration purposes.

An WAP is a device that allows wireless communication devices, such as clients, to connect to a wireless network using a standard, such as an 802.11 standard or other type of standard. The WAPs A-B include network interfaces equipped for interfacing with the router 102, another network outside the wireless network 103 (e.g., the Internet or an access network) via the router 102, and the client devices 1-3. The WAPs A-B may connect to the router 102 through a wireless or wired connection. A client device (also referred to as a client) is a device with a wireless network interface for connecting to a wireless network, and may include an end user device, such as a laptop, desktop computer, cell phone, etc. The wireless network interface is commonly referred to as a radio. Network devices are any devices that communicate via a wireless network, such as clients and WAPs. A cell comprises a WAP and may include at least one client that is served by the WAP to communicate via the wireless network. A cell may exist without any clients especially since clients may be mobile and move from one cell to another. A WAP without clients may still send periodic beacons which are described in further detail below. Cell size may be based on the number of clients the WAP can support and the communication range of the WAP.

In FIG. 1, each of the clients 1-3 is wirelessly connected to one of the WAPs A-B. The clients 1-3 may be connected to the Internet 101 via one of the WAPs A-B and the router 102. For example, the clients 1-3 may receive different types of data flows, such as VoIP, multiplayer game data, streaming video or audio, or bulk transfer of data.

The WAPs A-B include cell ID determination modules 110a-b cell ID inserter modules 111a-b and cell ID detector modules 112a-b. A module may be hardware or machine readable instructions executed by hardware, such as a processor or processing circuitry. The cell ID determination modules 110a-b determine unique cell IDs for each cell. For example, the cell ID determination modules 110a randomly selects a non-zero cell ID that is not used by other WAPs operating in the same channel in a given area associated with the range of the WAP A. A channel may be a frequency or range of frequencies for communicating within the wireless network. Each WAP may broadcast its cell ID in a beacon in the channel so other WAPs operating in the same channel and within range know the cell IDs of each other and can select a cell ID not used by another WAP. The beacon is broadcasted, so clients on the broadcast channel also receive the beacon. The beacon also includes the MAC address of the WAP, which may be provided as the basic service set identification (BSSID) in an 802.11 beacon. For example, WAP A sends a beacon on the channel used by client 1, and the beacon includes the cell ID and the MAC address of WAP A. Client 1 receives the beacon and can determine from the MAC address that the beacon is from WAP A and stores the cell ID.

The cell ID inserter modules 111a-b insert their cell IDs in the headers of frames sent from WAPs A-B to their clients. For example, the cell ID inserter module 111a inserts the cell ID of WAP A in the header (e.g., physical layer header) of frames sent by WAP A. The cell ID may be inserted in a cell ID field of a physical layer header. For 802.11, existing fields or portions of existing fields in the PHY header may be used as the cell ID field. The number of bits in the cell ID field may be based on the number of cells that need unique IDs.

The cell ID detector modules 112a-b determine the cell ID from received frames. For example, the cell ID detector module 112a checks the PHY header of a received frame sent by client 1 to determine whether it includes a non-zero cell ID. If it includes a non-zero cell ID, it compares the cell ID to the cell ID of WAP A, which may be stored in the radio of WAP A. If the cell ID matches the cell ID of WAP A then it continues to receive the frame, or else, it stops receiving the frame and then may send or receive another frame.

The clients 1-3 may include cell ID inserter modules 121a-c and cell ID detector modules 122a-c that perform the same functions as the cell ID inserter modules and detector modules of the WAPs. For example, the cell ID inserter module 121a inserts the cell ID of WAP A in the physical layer header of outgoing frames destined for the WAP A. The cell ID detector module 122a checks the physical layer header of a received frame to determine whether it includes a non-zero cell ID. If it includes a non-zero cell ID, it compares the cell ID to the cell ID of WAP A, which may be stored in the radio of client 1. If the cell ID matches the cell ID of WAP A then it continues to receive the frame, or else, it stops receiving the frame and then may send or receive another frame. For example, if the cell ID matches the cell ID of WAP A, client 1 determines the frame is from WAP A and continues to receive the frame. If the cell ID does not match, client 1 determines the frame is an interfering frame and that it is not the destination for the frame. Client 1 then stops receiving the frame and may send or receive another frame.

In 802.11, if the radio is locked on a frame currently being received, a new frame must be at least 10 dB stronger than the locked frame for the radio to stop receiving and decoding the current frame and start receiving and decoding the new frame. By using the cell ID, the radio may stop receiving the current frame regardless of the signal strength of the new frame if the current frame does not have a matching cell ID in the header.

The cell ID detector module 122a may also determine if a message received from WAP A is a beacon, for example based on information in the header. If it is a beacon, client 1 determines if the beacon is from WAP A by comparing the MAC address of WAP A with a MAC address in the beacon. If it is a beacon from WAP A, the cell ID is extracted from the payload of the beacon and stored in client 1.

Figure 2:
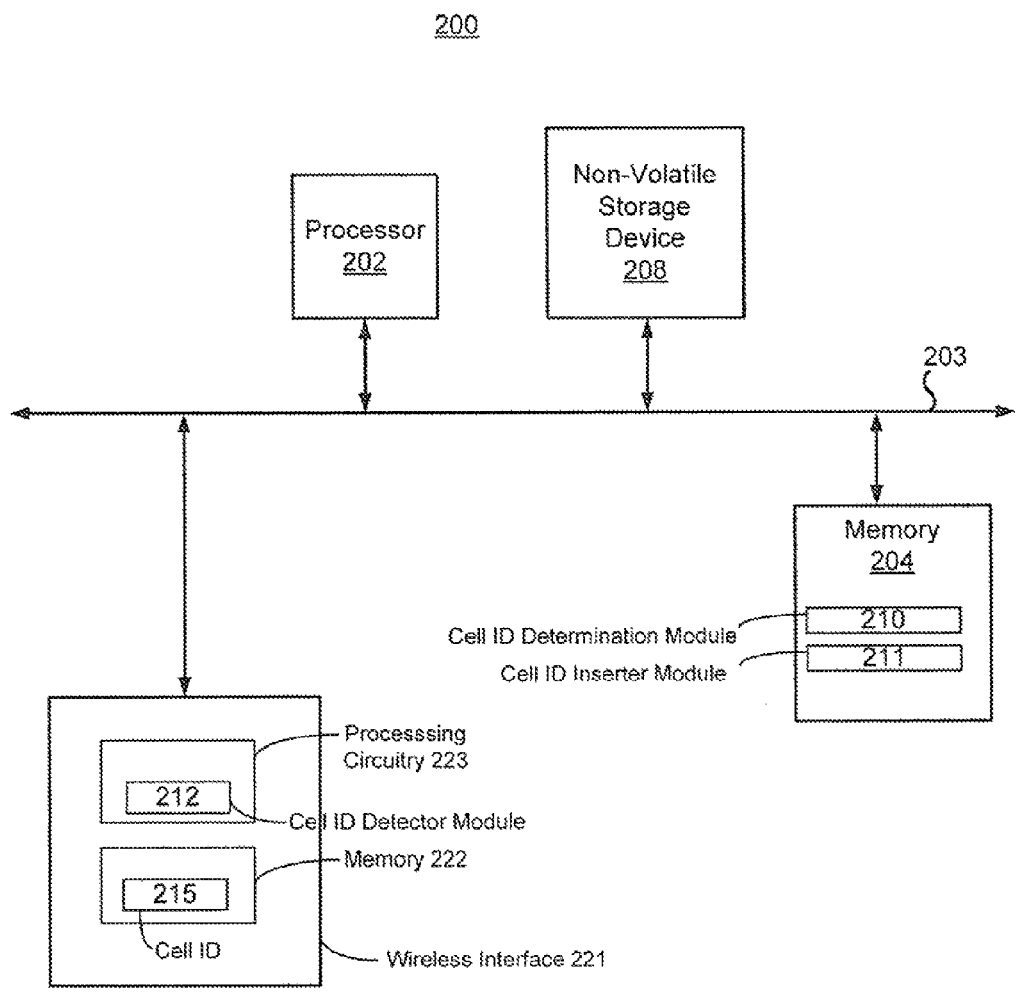
FIG. 2 illustrates a hardware platform.

FIG. 2 illustrates a hardware platform 200 of a network device. The hardware platform may be a platform for a WAP or a client shown in FIG. 1. The components shown in the hardware platform 200 may be used in different types of network devices but the different types of network devices ma include different components as well that are not shown. The hardware platform 200 includes one or more processors or processing circuitry (e.g., application-specific integrated circuit) represented by processor 202, providing an execution platform for executing machine readable instructions including software. The processor 202 may process a frame according to executed machine readable instructions, including preparing, sending and/or forwarding frames to a destination. Commands and data from the processor 202 are communicated over a communication bus 203. The hardware platform 200 also includes non-transitory computer readable storage mediums including a memory 204, such as a Random Access Memory (RAM), where software is resident during runtime, and a secondary storage 208. The secondary storage 208 may include nonvolatile data storage where a copy of the software and data are stored.

The memory 204 may store modules that are comprised of machine readable instructions executable by the processor 202 at runtime. Some examples of modules in the memory 204 are shown. For example, a memory cell ID determination module 210 and a cell ID inserter module 211 may be stored in the memory 204. The cell ID determination module 210 may include the module 110a or 110b shown in FIG. 1 if the hardware platform 200 is used in a WAP. The cell ID inserter module 211 may include the modules 111a-c or 121a-c shown in FIG. 1. Other modules may be stored in the memory 204 at runtime.

The hardware platform 200 includes a wireless interface 221 for communicating in a wireless network. The wireless interface 221 may be a radio in a WAP or client. The wireless interface 221 may include memory 222 and processing circuitry 223. The memory 222 and processing circuitry 223 may be provided in a chipset. The memory 222 may store a cell ID 215 of a WAP, which is used to determine whether a received frame is destined for the receiving device. The cell ID 215 may also be stored in the memory 204. Some modules may be in the wireless interface 221 and may be hardware only or machine readable instructions executed by hardware. In one example, cell ID detector module 212 may be in the wireless interface 221. For example, the cell ID detector module 212 may be the module 112a-b or 122a-c as shown in FIG. 1, and determines the cell ID from a physical layer header in a received frame and compares the cell ID from the frame with the cell ID 215 to determine whether the frame is destined for the receiving device. Other modules may be embodied in the wireless interface 221, such as the cell ID inserter module 211.

Figure 3:
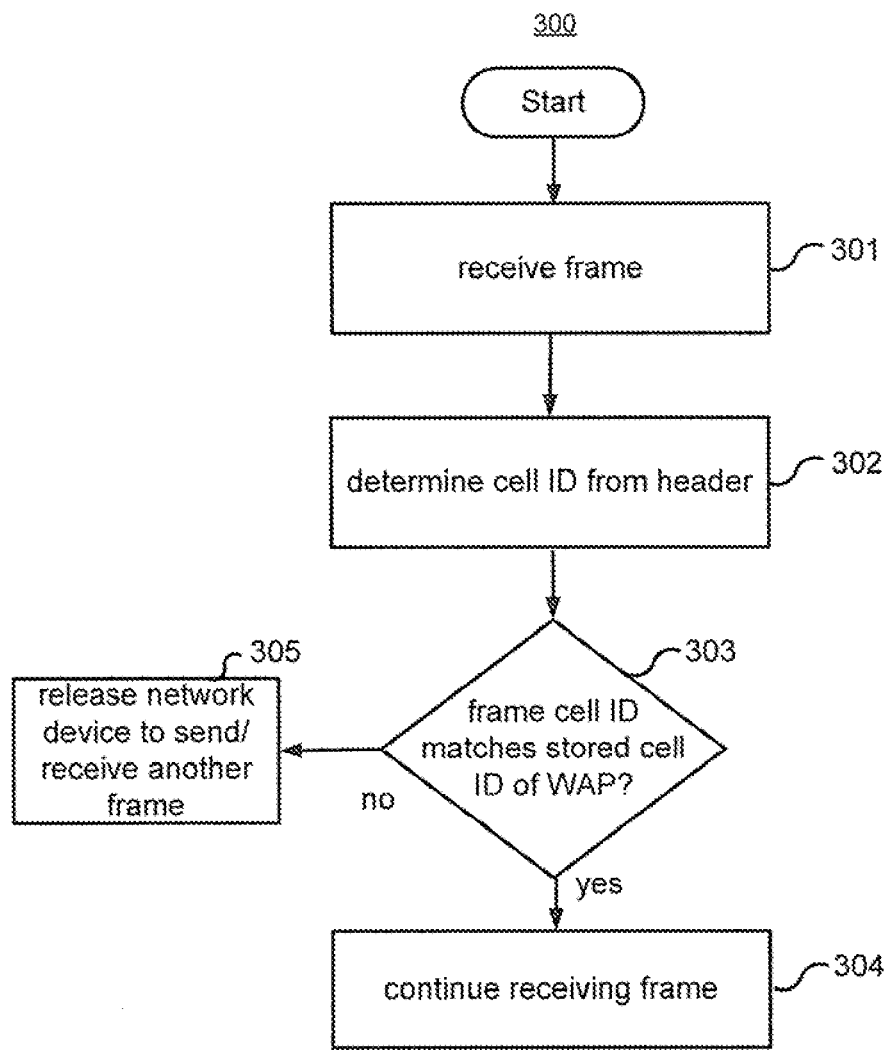
FIG. 3 illustrates a method for receiving a frame in a wireless network.

FIG. 3 shows an example of a method 300 for receiving a frame in a wireless network. The methods 300 and 400, described below, are described with respect to the system 100 shown in FIG. 1 by way of example. For example, the method 300 may be performed by a WAP or a client device shown in FIG. 1 and the method 400 may be performed by a WAP shown in FIG. 1. The methods may be performed by other systems.

At 301, a frame is received at a network device. The network device may include a WAP or a client device shown in FIG. 1 or any device that communicates with a WAP to send or receive data in the wireless network.

At 302, a cell ID is determined from a header of the frame, for example, by a cell ID determination module shown in FIG. 1. The cell ID may be in a physical layer header of the frame. For example, the cell ID is in a 802.11 PHY level header (e.g., PLCP header) rather than in a payload of a frame. Before receiving and decoding the payload and the entire frame, the receiving device decodes the physical layer header, which comes ahead of the payload, to determine the cell ID in the physical layer header, which may then be used to determine whether the frame is for the receiving device. As described below, if the frame is not for the receiving device, the receiving device is then released to send or receive other frames without having to decode the payload, thus improving throughput for the receiving device.

At 303, a determination is made as to whether the cell ID in the header matches a stored cell ID for a WAP, for example, by a cell ID determination module shown in FIG. 1. If the cell ID from the header matches the stored cell ID, at 304, the network device continues receiving the frame at the network device. For example, the frame headers and payload are received and decoded. If the cell ID from the header does not match the stored cell ID, at 305, the network device is released to send or receive another frame. For example, the network device stops receiving the frame and may send or receive another frame. If sending another frame, the network device may determine whether a signal strength is below a carrier sense threshold before sending to avoid interference.

Figure 4:
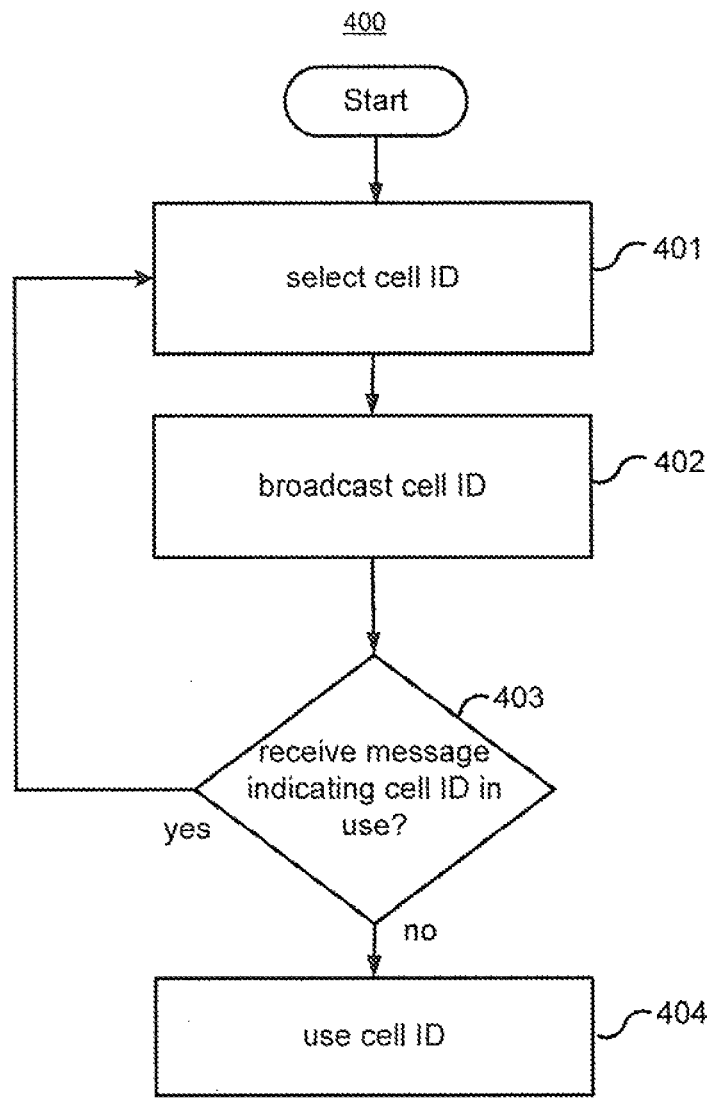
FIG. 4 illustrates a method for determining a cell ID for a WAP.

FIG. 4 illustrates a method for determining a cell ID. A WAP may determine the cell ID. At 401, the WAP selects a cell ID. For example, the WAP may randomly select a cell ID that is not used by another WAP. The WAP may store cell IDs used by its neighbor WAPs and selects a cell ID that is not being used.

At 402, the WAP broadcasts the selected cell ID. The broadcast may be received by any client device or WAP in the wireless network that is within range. For example, the WAP sends a beacon with the selected cell ID. The beacon may be transmitted on the channel used by the WAP to communicate with its clients in its cell. The beacon message includes the cell ID in its payload, for example, in an 802.11 beacon information element. Clients that are in the WAP's cell store the cell ID of the WAP so the clients can use the cell ID to determine whether a received frame is from the WAP or another network device. Also, neighbor WAPs that are within range of the WAP may store the cell ID of the WAP. For example, neighbor WAPs on the same channel may interfere with communications in the WAP's cell. The neighbor WAPs may store the cell ID of the WAP so they do not use the same cell ID. Neighbor WAPs may be WAPs within range of each other.

In certain instances the WAP may not know the cell IDs of all its neighbors that may interfere. For example, if the WAP is new or just switched to the channel, it may not have the cell Ds of all its neighbors using the channel. At 403, the WAP determines whether it receives any messages from neighbor WAPs indicating that its cell ID is being used by another WAP. If so, the WAP selects and broadcasts another cell ID. In one example, beacons may be sent periodically (e.g., every 100 milliseconds), so it is less likely that a WAP would not know its neighbor cell IDs and it is less likely the WAP selects a cell ID currently being used by a neighbor on the same channel. However, if the WAP receives a message indicating the cell ID is being used by another WAP, then the WAP selects and broadcasts a new unique cell ID. If no messages are received within a predetermined time, the WAP uses the cell ID at 404. For example, the WAP inserts the cell ID in the physical layer header of the frames sent to clients in its cell. In some instances, beacons or other broadcasted frames meant to be heard by devices outside the same cell, may have the cell ID field set to zero or empty, instead of filling it with the non-zero cell ID value. In these instances, the receiving devices receive and decode the beacons and the broadcast frames till the end of the frames so the receiving devices can get the information from the payload.

While the embodiments have been described with reference to examples, various modifications to the described embodiments may be made without departing from the scope of the claimed embodiments.

What is claimed is:

1. A method of receiving a frame in a wireless network, the method comprising:
   receiving a first portion of a frame at a network device, wherein the first portion of the frame includes a physical layer header;
   determining a cell ID in the physical layer header of the first portion of the frame before receiving a second portion of the frame including a payload;
   if the cell ID from the physical layer header matches a stored cell ID, continue receiving a remainder of the frame, wherein the stored cell ID uniquely identifies a wireless access point; and
   if the cell ID from the physical layer header does not match the stored cell ID, releasing the network device, before receiving the remainder of the frame, to send or receive another frame.

2. The method of claim 1, wherein if the cell ID from the physical layer header does not match the stored cell ID, stopping the receiving of the remainder of the frame, and receiving another frame regardless of a signal strength of the another frame.

3. The method of claim 1, wherein if the cell ID from the physical layer header does not match the stored cell ID, stopping the receiving of the remainder of the frame, and sending another frame from the network device.

4. The method of claim 3, wherein the sending of the another frame comprises:
   determining if a signal strength is below a carrier sense threshold;
   sending the another frame if the signal strength is below the carrier sense threshold; and
   waiting for the signal strength to fall below the carrier sense threshold to send the another frame if the signal strength is above the carrier sense threshold.

5. The method of claim 1, wherein the network device comprises a client device connected to the wireless access point in a cell and the method comprises:
   receiving a broadcast at the client device from the wireless access point;
   determining the cell ID that uniquely identifies the wireless access point from the broadcast; and
   storing the cell ID in the client device.

6. The method of claim 5, wherein the determining of the cell ID comprises determining the cell ID in a software layer in the client device and the storing comprises storing the cell ID in a memory of a radio in the client device, wherein the radio determines the cell ID from the physical layer header of the frame.

7. The method of claim 5, wherein the cell ID is not used by wireless access points in neighboring cells using the same frequency.

8. The method of claim 1, wherein the releasing of the network device to send or receive another frame comprises sending or receiving the another frame prior to decoding the payload of the frame.

9. A network device in a cell in a wireless network, the network device comprising:

a wireless interface to receive a first portion of a frame, wherein the first portion of the frame includes a physical layer header;

a storage device to store a cell ID uniquely identifying a wireless access point in the cell; and processing circuitry to determine a cell ID in the physical layer header of the first portion of the frame before receiving a second portion of the frame including a payload, and if the cell ID from the physical layer header matches the stored cell ID, to continue to receive a remainder of the frame, and if the cell ID from the physical layer header does not match the stored cell ID, to release the network device, before receiving the remainder of the frame, to send or receive another frame.

10. The network device of claim 9, wherein if the cell ID from the physical layer header does not match the stored cell ID, the network device stops receiving the remainder of the frame, and receives another frame regardless of a signal strength of the another frame.

11. The network device of claim 9, wherein if the cell ID from the physical layer header does not match the stored cell ID, the network device stops receiving the remainder of the frame and sends another frame.

12. The network device of claim 9, wherein if the cell ID from the physical layer header does not match the stored cell ID, the processing circuitry is to determine if a signal strength is below a carrier sense threshold, send another frame if the signal strength is below the carrier sense threshold, and wait for the signal strength to fall below the carrier sense threshold to send the another frame if the signal strength is above the carrier sense threshold.

13. The network device of claim 9, wherein the processing circuitry is to receive a broadcast at the client device from the wireless access point, determine the cell ID from the broadcast, and store the cell ID.

14. A wireless access point comprising:

a wireless interface to send or receive frames in a cell in a wireless network;

a storage device to store a cell ID uniquely identifying a wireless access point in the cell; and processing circuitry to:
insert the cell ID in a physical layer header of a frame, send the frame to a client device in the cell via the wireless interface, determine a received cell ID in a physical layer header of a first portion of an incoming frame from the client device to the wireless interface, before receiving a second portion of the incoming frame including a payload, if the received cell ID from the physical layer header matches the stored cell ID, continue to receive a remainder of the incoming frame at the wireless interface, and if the received cell ID from the physical layer header does not match the stored cell ID, discontinue receiving the remainder of the incoming frame at the wireless interface.

15. The wireless access point of claim 14, wherein the wireless interface broadcasts the cell ID, and the client device receives and stores the cell ID and determines if the cell ID from the physical layer header matches the cell ID received in the broadcast to determine if the client device is the destination for the frame.

* * * * *